(12) United States Patent
Liang et al.

(10) Patent No.: US 8,144,465 B2
(45) Date of Patent: Mar. 27, 2012

(54) FAN ASSEMBLY AND ELECTRONIC DEVICE INCORPORATING THE SAME

(75) Inventors: Zhi-Chun Liang, Shenzhen (CN); Fang Tian, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 112 days.

(21) Appl. No.: 12/832,949

(22) Filed: Jul. 8, 2010

(65) Prior Publication Data

US 2011/0299245 A1    Dec. 8, 2011

(30) Foreign Application Priority Data

Jun. 8, 2010   (CN) .......................... 2010 1 0194923

(51) Int. Cl.
    *H05K 7/20*    (2006.01)
    *F04D 29/66*    (2006.01)
    *G06F 1/20*    (2006.01)

(52) U.S. Cl. ................... 361/692; 361/679.48; 361/690; 361/695; 454/184; 415/119; 416/91; 416/241 A; 181/200; 181/202; 181/210; 181/224; 181/225

(58) Field of Classification Search ............. 361/679.46, 361/679.47, 679.48, 679.5, 679.52, 690–697, 361/704–727, 800, 801, 802, 816, 818, 831; 174/50, 35 BC, 350, 358, 35 MS, 377; 454/184; 165/104.33, 121–126, 135, 185; 312/223.2, 312/223.3; 181/200–205, 210–229, 252, 181/255, 258, 268, 288, 290, 291, 295; 415/119, 415/208.2, 115, 173, 220; 416/91, 241 A, 416/191, 247 R, 203, 229 R; 381/71.1–71.7

See application file for complete search history.

(56) References Cited

U.S. PATENT DOCUMENTS

| | | | | |
|---|---|---|---|---|
| 4,692,091 A * | 9/1987 | Ritenour | ....................... | 415/119 |
| 5,000,079 A * | 3/1991 | Mardis | ....................... | 454/184 |
| 5,332,872 A * | 7/1994 | Ewanek | ....................... | 181/224 |
| 5,473,123 A * | 12/1995 | Yazici et al. | ................. | 181/224 |
| 5,526,228 A * | 6/1996 | Dickson et al. | ............... | 361/695 |
| 5,532,439 A * | 7/1996 | Minkin | ....................... | 181/224 |
| 5,601,410 A * | 2/1997 | Quinlan | ................... | 416/241 A |
| 6,086,476 A * | 7/2000 | Paquin et al. | ................. | 454/184 |
| 6,104,608 A * | 8/2000 | Casinelli et al. | ............. | 361/692 |
| 6,198,627 B1 * | 3/2001 | Roehling et al. | ............. | 361/688 |
| 6,379,111 B1 * | 4/2002 | Katoh et al. | .................. | 415/119 |
| 6,459,578 B1 * | 10/2002 | Wagner | ....................... | 361/694 |
| 6,481,527 B1 * | 11/2002 | French et al. | ................. | 181/201 |
| 6,668,970 B1 * | 12/2003 | Lee | ............................... | 181/224 |
| 6,690,576 B2 * | 2/2004 | Clements et al. | ............. | 361/695 |

(Continued)

FOREIGN PATENT DOCUMENTS

CN           201184328 Y   *   1/2009

*Primary Examiner* — Michail V Datskovskiy

(74) *Attorney, Agent, or Firm* — Altis Law Group, Inc.

(57) ABSTRACT

An exemplary fan assembly includes a fan and a muffler. The fan includes an air outlet. The muffler is disposed at the air outlet of the fan. The muffler includes a base plate. The base plate defines vents therein and blades thereon corresponding to the air outlet of the fan. The blades extend from the base plate toward the fan. An electronic device incorporating the fan assembly is also provided.

20 Claims, 4 Drawing Sheets

U.S. PATENT DOCUMENTS

| | | | |
|---|---|---|---|
| 6,896,095 B2* | 5/2005 | Shah et al. | 181/198 |
| 6,953,104 B2* | 10/2005 | Monson et al. | 181/224 |
| 7,004,726 B2* | 2/2006 | Kuo | 416/247 R |
| 7,161,801 B2* | 1/2007 | Chen et al. | 361/690 |
| 7,314,113 B2* | 1/2008 | Doll | 181/225 |
| 7,353,908 B1* | 4/2008 | French | 181/206 |
| 7,379,298 B2* | 5/2008 | Walsh et al. | 361/692 |
| 7,382,632 B2* | 6/2008 | Alo et al. | 361/825 |
| 7,431,127 B2* | 10/2008 | de Borchgrave et al. | 181/229 |
| 7,549,505 B1* | 6/2009 | Kawar | 181/210 |
| 7,644,803 B2* | 1/2010 | Hashizume | 181/225 |
| 7,707,711 B2* | 5/2010 | Bartell et al. | 29/832 |
| 7,712,576 B2* | 5/2010 | Goto et al. | 181/225 |
| 7,779,960 B2* | 8/2010 | Tang et al. | 181/225 |
| 7,891,464 B2* | 2/2011 | Tang et al. | 181/225 |
| 7,909,135 B2* | 3/2011 | Furuya | 181/224 |
| 7,929,295 B2* | 4/2011 | Joshi | 361/679.5 |
| 7,942,234 B2* | 5/2011 | Utsunomiya | 181/225 |
| 7,990,701 B2* | 8/2011 | Yeh et al. | 361/679.48 |
| 2006/0131101 A1* | 6/2006 | Crocker | 181/224 |
| 2011/0108359 A1* | 5/2011 | Nishimura et al. | 181/290 |

* cited by examiner

FAN ASSEMBLY AND ELECTRONIC DEVICE INCORPORATING THE SAME

BACKGROUND

1. Technical Field

The disclosure generally relates to fan assemblies, and particularly to a fan assembly which generates less noise, and an electronic device incorporating such fan assembly.

2. Description of Related Art

It is well known that heat is generated by many kinds of electronic components, such as integrated circuit chips, during their operation. If the heat is not efficiently removed, the electronic components may suffer damage. Thus, fans are often used to produce airflow to cool the electronic components.

However, a typical fan may generate a large amount of noise during its operation, particularly when operating at high speed. The noise generated by the fan is liable to annoy users.

What is needed, therefore, is a fan assembly and an electronic device incorporating the fan assembly which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead placed upon clearly illustrating the principles of the present embodiments. Moreover, in the drawings, like reference numerals designate corresponding parts throughout the various views.

DETAILED DESCRIPTION

Figure 1:
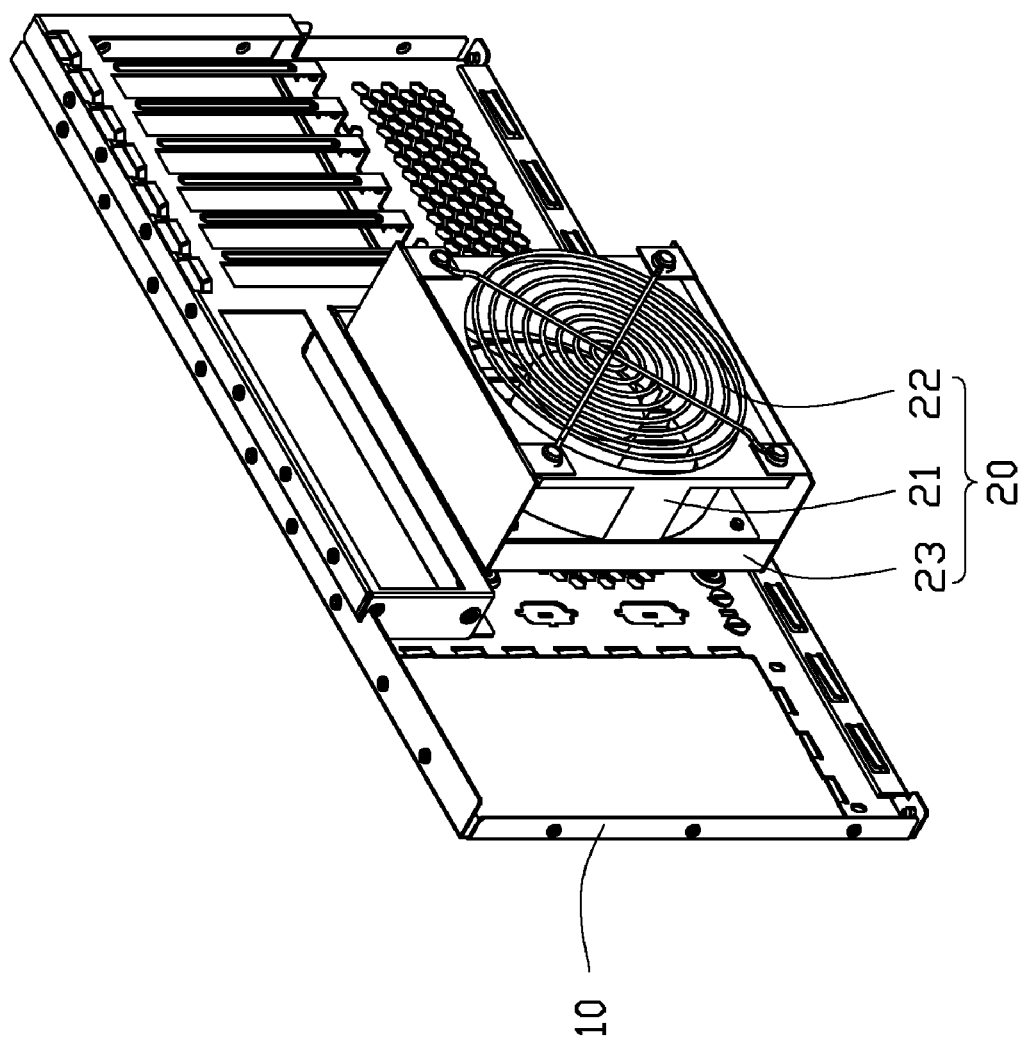
FIG. 1 is an assembled, isometric view of part of an electronic device in accordance with one embodiment of the disclosure.
Figure 2:
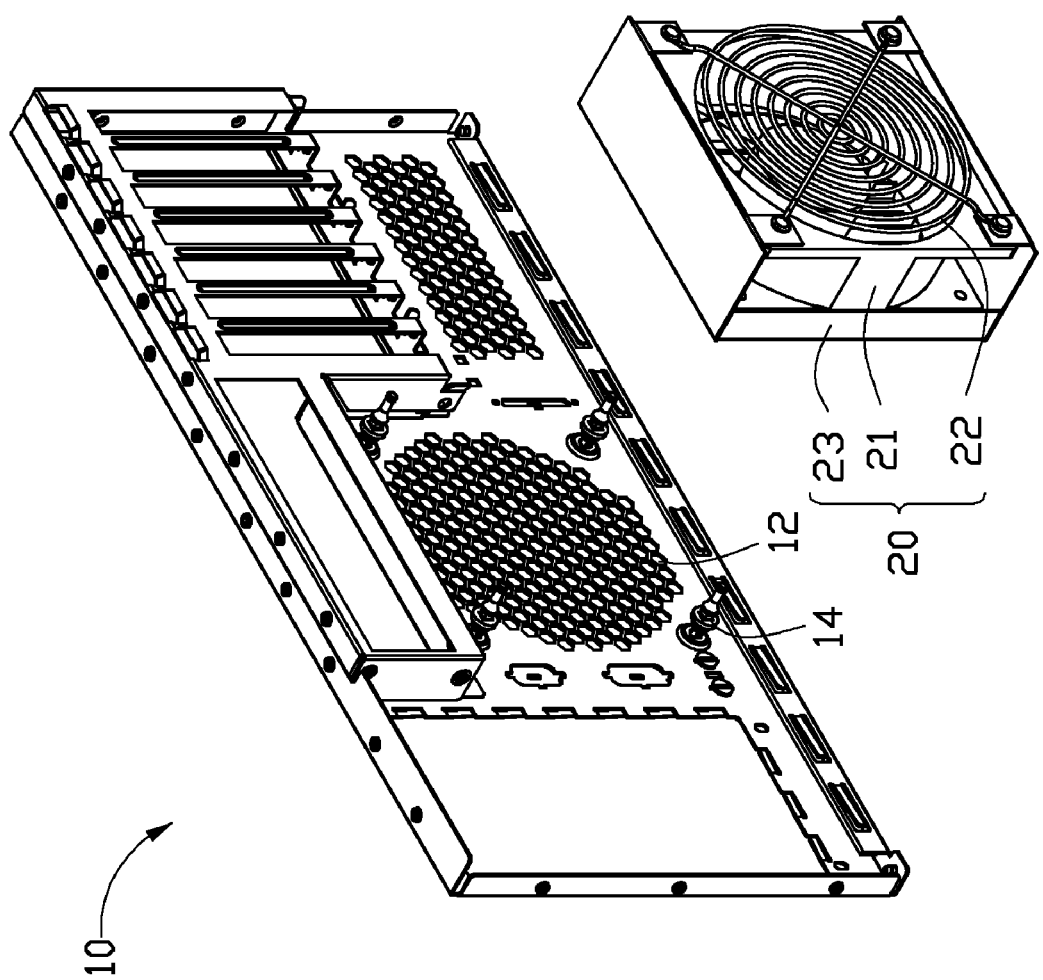
FIG. 2 is an exploded view of the electronic device shown in FIG. 1.

Referring to FIGS. 1 and 2, an electronic device in accordance with one embodiment of the disclosure is shown. The electronic device can be a computer, a server or other. The electronic device includes a system enclosure 10, and a fan assembly 20 received in the system enclosure 10.

In this embodiment, only a few components, such as a side plate, of the system enclosure 10 are shown. The system enclosure 10 defines a plurality of holes 12 therein, and forms four fasteners 14 around the holes 12. The holes 12 are arrayed in a substantially circular configuration.

Figure 3:
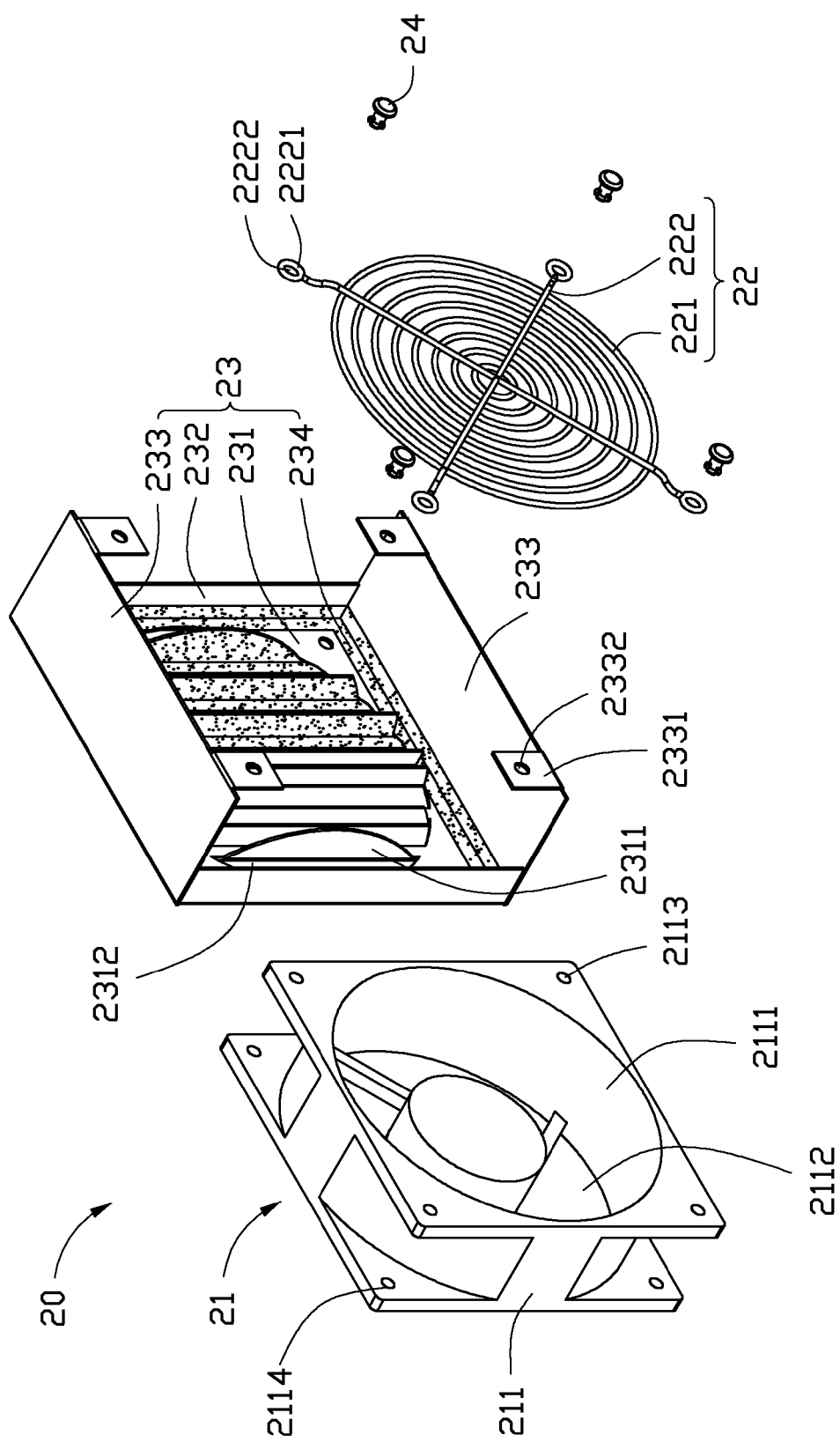
FIG. 3 is an exploded, isometric view of a fan assembly of the electronic device shown in FIG. 2.

The fan assembly 20 dissipates heat generated by a heat-generating electronic component (not shown), such as a central processing unit (CPU) or other component, in the system enclosure 10. Referring also to FIG. 3, the fan assembly 20 includes a fan 21, and a cover 22 and a muffler 23 disposed at opposite sides of the fan 21, respectively.

In this embodiment, the fan 21 is an axial fan, and includes a frame 211 and a rotor (not shown) received in the frame 211. The frame 211 is hollow and substantially cuboid. The frame 211 defines an air inlet 2111 at one side adjacent to the cover 22, and an air outlet 2112 at another opposite side adjacent to the muffler 23. The frame 211 further defines a fixing hole 2113 at each corner thereof around the air inlet 2111, and an orienting hole 2114 at each corner thereof around the air outlet 2112.

The cover 22 covers the air inlet 2111 of the frame 211, preventing wires (not shown) or other components in the system enclosure 10 from entering the frame 211 and affecting operation of the fan 21. The cover 22 includes a plurality of rings 221, and two elongated fixing arms 222 interconnecting the rings 221. The rings 221 and the fixing arms 222 are made of metal wires, such as aluminum wires. The rings 221 are concentric and evenly spaced from each other. The rings 221 have gradually increased diameters from an inmost ring 221 to an outmost ring 221. A diameter of the outmost ring 221 is substantially equal to a diameter of the air inlet 2111 of the frame 211. The fixing arms 222 are joined together in an X-shape, that is, they form a cross-shaped configuration. Each of the fixing arms 222 forms two annular clasps 2221 at opposite ends thereof, respectively. Each of the clasps 2221 defines a joining hole 2222 therein aligning with a corresponding fixing hole 2113 of the frame 211.

Figure 4:
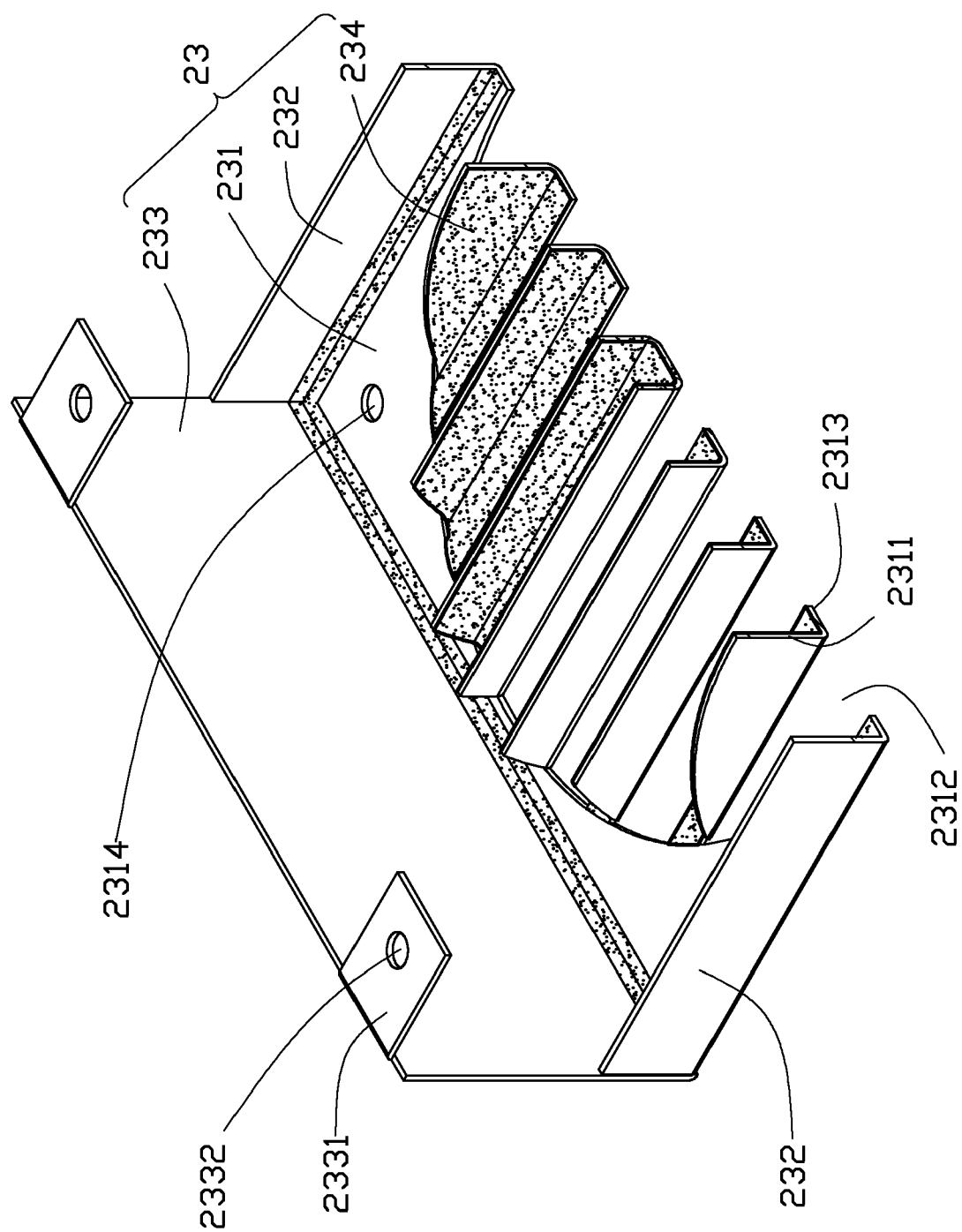
FIG. 4 is an isometric view of half of a muffler of the fan assembly of FIG. 3.

Referring also to FIG. 4, the muffler 23 includes a rectangular base plate 231, two first side plates 232 extending perpendicularly out from opposite sides of the base plate 231, two second side plates 233 extending perpendicularly out from another opposite sides of the base plate 231, and an acoustic absorbing layer 234 disposed on the base plate 231, the first side plates 232 and the second side plates 233.

The base plate 231 includes a plurality of blades 2311 punched perpendicularly from a central portion thereof toward the fan 21. Thereby, a plurality of vents 2312 are defined in the base plate 231, and a plurality of supporting ribs 2313 are formed between the vents 2312. Each of the blades 2311 extends perpendicularly from one lateral side of a corresponding supporting rib 2313 toward the fan 21. The blades 2311 are laminar, spaced from each other, and parallel to each other. Two outmost blades 2311 each have an arcuate inner peripheral thin edge, and the other blades 2311 between the outmost blades 2311 are straight and elongated. The vents 2312 are parallel to each other, and are staggered with the supporting ribs 2313. Each of the vents 2312 has the same shape as a corresponding blade 2311. Two outmost vents 2312 each have an arcuate long lateral extremity. Each of opposite end extremities of the other vents 2312 between the outmost vents 2312 are arcuate. The long lateral extremities of the outmost vents 2312 and the end extremities of the other vents 2312 are substantially located on an imaginary circle, which has a diameter not less than that of the air outlet 2112 of the fan 21. In this embodiment, the diameter of the imaginary circle is equal to the diameter of the air outlet 2112 of the fan 21. The base plate 231 defines an engaging hole 2314 in each corner thereof. The engaging holes 2314 are disposed around the plurality of vents 2312, and each engaging hole 2314 aligns with a corresponding fastener 14 of the system enclosure 10 and a corresponding orienting hole 2114 of the fan 21.

The first and second side plates 232, 233 are laminar, and are integrally formed with the base plate 231 as a single monolithic piece. Alternatively, each of the first and second side plates 232, 233 can be a single monolithic body welded or riveted on the base plate 231. The first side plates 232 are perpendicular to the second side plates 233, and are parallel to the blades 2311 of the base plate 231. Each first side plate 232 is shorter than each second side plate 233 as measured along a direction perpendicular to the base plate 231, and is slightly longer than each blade 2311 of the base plate 231 as measured along the same direction. Two tabs 2331 extend perpendicularly from two opposite ends of a free lateral side of each second side plate 233, respectively. The tabs 2331 extend toward the other second side plate 233. That is, the tabs 2331 of each second side plate 233 extend toward the tabs 2331 of the other second side plate 233. Each of the tabs 2331 defines a through hole 2332 therein. The through hole 2332 aligns with a corresponding joining hole 2222 of the cover 22 and a corresponding fixing hole 2113 of the frame 211 of the fan 21.

The acoustic absorbing layer 234 is for absorbing noise generated by the fan 21 during its operation. The acoustic absorbing layer 234 is made of porous, acoustic absorbing material, such as sponge, foamed plastic, glass wool, fibers, or others. In the illustrated embodiment, the acoustic absorbing layer 234 is spread on parts of inner surfaces of about half of the blades 2311, on parts of inner surfaces of about half of the supporting ribs 2313, and on inner surfaces of all joints of any two of the base plate 231, the first side plates 232 and the second side plates 233. Alternatively, the acoustic absorbing layer 234 can be spread on all surfaces of the muffler 23 facing the fan 21, or only on other selected parts of such surfaces. For example, the acoustic absorbing layer 234 may be spread only on the blades 2311 of the base plate 231.

During assembly of the electronic device, the fan 21 is laterally inserted into the muffler 23 until the fan 21 is located between the first and second side plates 232, 233, with the air outlet 2112 of the fan 21 facing the base plate 231 of the muffler 23. At this time, the fixing holes 2113 of the fan 21 align with the through holes 2332 of the muffler 23, respectively, and the orienting holes 2114 of the fan 21 align with the engaging holes 2314 of the muffler 23, respectively. The cover 22 is arranged on the muffler 23, with the joining holes 2222 of the cover 22 aligning with the through holes 2332 of the muffler 23, respectively. Four fasteners 24 are provided to extend successively through the joining holes 2222 of the cover 22, the through holes 2332 of the muffler 23 and the fixing holes 2113 of the fan 21, respectively, thereby mounting the fan 21 and the cover 22 on the muffler 23. Then the fan assembly 20 (i.e., the combined muffler 23, fan 21 and cover 22) is mounted on the system enclosure 10, with the fasteners 14 extending successively through the engaging holes 2314 of the muffler 23 and the orienting holes 2114 of the fan 21, respectively. At this time, the air outlet 2112 of the fan 21 and the vents 2312 of the muffler 23 align with the holes 12 of the system enclosure 10.

In the fan assembly 20 and the electronic device incorporating the fan assembly 20, the muffler 23 is disposed at the air outlet 2112 of the fan 21, and the muffler 23 forms a plurality of blades 2311 thereon and defines a plurality of vents 2312 therein corresponding to the air outlet 2112 of the fan 21. Therefore, during operation of the fan assembly 20, a portion of the noise generated by the fan 21 is diffracted by the blades 2311 of the muffler 23, whereby the corresponding noise received by a user can be reduced. Another portion of the noise generated by the fan 21 is reflected by the blades 2311 of the muffler 23. The reflected noise counteracts some of the noise generated by the fan 21. In addition, the airflow generated by the fan 21 passes through the vents 2312 of the muffler 23 for dissipating heat to the outside of the electronic device. Thus, the noise generated by the fan 21 can be reduced without adversely affecting the heat dissipation efficiency of the fan 21. Furthermore, the muffler 23 forms the acoustic absorbing layer 234 thereon. The acoustic absorbing layer 234 can further absorb portions of the noise generated by the fan 21.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan assembly comprising:
a fan comprising an air outlet; and
a muffler disposed at the air outlet of the fan, the muffler comprising a base plate, the base plate comprising a plurality of blades thereon and defining a plurality of vents therein corresponding to the air outlet of the fan, the blades extending from the base plate toward the fan.

2. The fan assembly of claim 1, wherein an acoustic absorbing layer is disposed on any one or more selected surfaces of the muffler which generally face the fan.

3. The fan assembly of claim 1, wherein the blades are punched from the base plate to extend toward the fan, and the base plate thereby defines the vents and further comprises a plurality of supporting ribs between the vents.

4. The fan assembly of claim 3, wherein the vents are staggered with the supporting ribs, and each of the vents has the same shape as a corresponding blade.

5. The fan assembly of claim 1, wherein two outmost vents each have an arcuate long lateral extremity, each of opposite end extremities of the other vents between the outmost vents are arcuate, and the long lateral extremities of the outmost vents and the end extremities of the other vents are substantially located on an imaginary circle.

6. The fan assembly of claim 5, wherein the imaginary circle has a diameter not less that of the air outlet of the fan.

7. The fan assembly of claim 1, wherein the blades are laminar, spaced from each other, and parallel to each other, two outmost blades each have an arcuate inner peripheral thin edge, and the other blades between the outmost blades are straight and elongated.

8. The fan assembly of claim 1, wherein the muffler further comprises two first side plates and two second side plate extending from the base plate, and the fan is located between the first and second side plates.

9. The fan assembly of claim 8, further comprising two fasteners, wherein each of the second side plates comprises a tab extending toward the other second side plate, each of the tabs defines a through hole therein, the fan defines two fixing holes therein aligning with the through holes of the tabs, respectively, and the fasteners extend successively through the through holes of the tabs and the fixing holes of the fan, respectively, thereby mounting the fan on the muffler.

10. An electronic device comprising:
an enclosure;
a fan received in the enclosure, the fan comprising an air outlet; and
a muffler disposed at the air outlet of the fan and mounted on the enclosure, the muffler comprising a base plate, the base plate comprising a plurality of blades thereon and defining a plurality of vents therein corresponding to the air outlet of the fan, the blades extending from the base plate toward the fan.

11. The electronic device of claim 10, wherein an acoustic absorbing layer is disposed on any one or more selected surfaces of the muffler which generally face the fan.

12. The electronic device of claim 10, wherein the blades are punched from the base plate to extend toward the fan, and the base plate thereby defines the vents and further comprises a plurality of supporting ribs between the vents.

13. The electronic device of claim 12, wherein the vents are staggered with the supporting ribs, and each of the vents has the same shape as a corresponding blade.

14. The electronic device of claim 10, wherein two outmost vents each have an arcuate long lateral extremity, each of opposite end extremities of the other vents between the outmost vents are arcuate, and the long lateral extremities of the outmost vents and the end extremities of the other vents are substantially located on an imaginary circle.

15. The electronic device of claim 14, wherein the blades are laminar, spaced from each other, and parallel to each other, two outmost blades each have an arcuate inner peripheral thin edge, and the other blades between the outmost blades are straight and elongated.

16. A fan assembly comprising:
a muffler comprising a plurality of blades thereon and defining a plurality of vents therein;
a fan adjacent to the muffler for directing airflow toward the blades and the vents of the muffler, the blades of the muffler extending toward the fan; and
an acoustic absorbing layer disposed on one or more selected surfaces of the blades of the muffler.

17. The fan assembly of claim 16, wherein the blades are punched from the base plate to extend toward the fan, the base plate thereby defines the vents and further comprises a plurality of supporting ribs between the vents, the vents are staggered with the supporting ribs, and each of the vents has the same shape as a corresponding blade.

18. The fan assembly of claim 17, wherein the muffler further comprises two first side plates and two second side plate extending from the base plate, and the fan is located between the first and second side plates.

19. The fan assembly of claim 18, wherein the acoustic absorbing layer is further disposed on selected surfaces of the supporting ribs of the base plate, and selected surfaces of joints of any two of the base plate, the first side plates and the second side plates.

20. The fan assembly of claim 16, wherein the blades are laminar, and are spaced from each other, two outmost vents each have an arcuate long lateral extremity, each of opposite end extremities of the other vents between the outmost vents are arcuate, and the long lateral extremities of the outmost vents and the end extremities of the other vents are substantially located on an imaginary circle.

* * * * *